United States Patent [19]

Roberts

[11] Patent Number: 5,424,626
[45] Date of Patent: Jun. 13, 1995

[54] TUNED A.C. POWER SYSTEMS COMPENSATOR HAVING VARIABLE REFLECTIVE IMPEDANCE FOR LINEAR AND NON-LINEAR REACTIVE LOAD COMPENSATION

[75] Inventor: Gary D. Roberts, Riverton, Utah

[73] Assignee: RemTech Co., Lindon, Utah

[21] Appl. No.: 917,227

[22] Filed: Jul. 23, 1992

Related U.S. Application Data

[63] Continuation-in-part of Ser. No. 871,066, Apr. 16, 1992.

[51] Int. Cl.$^6$ .............................................. G05F 5/06
[52] U.S. Cl. .................................... 323/208; 323/206; 323/356
[58] Field of Search ................ 323/208, 207, 206, 205, 323/214, 209, 355, 356; 363/124

[56] References Cited

U.S. PATENT DOCUMENTS

| | | | |
|---|---|---|---|
| 2,069,825 | 2/1937 | Farkas et al. | 323/208 |
| 2,386,458 | 10/1945 | Haug | 323/208 |
| 2,405,837 | 8/1946 | Lang | 323/208 |
| 3,252,079 | 5/1966 | Portort | 323/208 |
| 3,365,595 | 1/1968 | Dzung | 323/208 |
| 3,895,275 | 7/1975 | Rostad | 318/818 |
| 4,001,672 | 1/1977 | Postolaty et al. | 323/208 |
| 4,025,864 | 5/1977 | Kennedy | 321/68 |
| 4,473,817 | 9/1984 | Perkins | 340/310 R |
| 4,672,298 | 6/1987 | Rohatyn | 323/208 |
| 5,105,327 | 4/1992 | Wohlforth | 323/208 |
| 5,216,356 | 6/1993 | Owen | 323/361 |

*Primary Examiner*—Steven L. Stephan
*Assistant Examiner*—Adolf Berhane
*Attorney, Agent, or Firm*—Robert B. Crouch

[57] ABSTRACT

The present invention provides means to instantaneously optimize reactive kva for an a.c. power system containing both linear and non-linear reactive loads. The preferred means utilizes a reflux transformer which is tuned for maximum energy transfer between primary and secondary windings. Each secondary winding is connected in series with a variable inductor and a fixed capacitive means, so as to continuously reflect variable reactive kva to the power system via the primary and secondary windings. The reactive kva requirements of the power system can thus be continuously optimized without destructive voltage transients associated with switching graduated units of fixed capacitive compensation or incurring the risk of conducting series resonant currents associated with non-linear loads.

10 Claims, 3 Drawing Sheets

TUNED A.C. POWER SYSTEMS COMPENSATOR HAVING VARIABLE REFLECTIVE IMPEDANCE FOR LINEAR AND NON-LINEAR REACTIVE LOAD COMPENSATION

This application is a continuation-in-part of U.S. patent application Ser. No. 871,066, filed Apr. 16, 1992.

The present invention relates to means for instantaneously optimizing reactive kva in an a.c. power system containing both linear and non-linear reactive loads.

BACKGROUND OF THE INVENTION

The power factor of an a.c. power system is of economic importance because of the high cost of reactive kva. Low power factor of a system results in unnecessary distribution losses, difficult voltage regulation and oversized equipment. To correct for low power factor it is well known in the a.c. induction motor art to shunt the induction motor by a capacitor or other source of capacitive reactance. Depending upon the application, correction may be provided for a given load by means of a capacitor rated for that load. Correction may also be provided for a variety of operational conditions by utilizing a bank of graduated static capacitors in parallel with the motor or by employing an over-excited synchronous motor as the source of capacitance. As a means of compensating for lagging currents within the motor as well as in the external circuit and to avoid the effects of harmonics, Steinmetz, U.S. Pat. No. 602,920, suggested connecting the source of capacitance to the motor through a step-up transformer. The fact that a single large capacitor could be utilized to reduce costs was recognized by Weichsel, U.S. Pat. No. 1,712,237. These prior art systems have a common fault, in that they frequently overcompensate or undercompensate for the reactive kva under changing load conditions.

Incorrect compensation results in excessive system kva loading, overheating, and inefficiencies. Furthermore, overcompensation can lead to inductive and synchronous machines becoming self-excited when sufficiently large capacitive currents are present in their stator circuits. These currents can result in serious overvoltage and/or excessive transient torques. As a consequence, shunt reactors are frequently installed at the sending end of lightly loaded distribution lines as a precautionary measure to help compensate for any excessive capacitive currents.

The ideal level of compensation for any a.c. system occurs when total units of capacitive and inductive kva are equal. In order to approach even reasonably compromised levels of desired compensation using prior art methods has required that capacitance be incrementally switched to follow changes in inductive loading. This approach does not allow for ideal compensation. Furthermore, as the capacitors are switched, hazardous voltage transients are generated which contribute to insulation breakdown and failure of other equipment connected to the power grid.

In an attempt to avoid the problems of the prior systems, Rohatyn, U.S. Pat. No. 4,554,502, has proposed a power factor correcting system in which voltage applied to a large capacitor through a step-up transformer is varied by means of a mechanically adjustable variable transformer. A control and sensing circuit is employed to drive a servo motor to adjust the variable transformer through a lead screw which carries a pair of brushes. This system avoids voltage transients due to switching, but the hazards which result from overcompensation or undercompensation remain, due to the inherently slow response of the system disclosed. The response time of the servo motor, when combined with that of the lead screw, results in the lapse of a significant interval of time between the sensing of reactive kva and completion of the voltage adjustment necessary to fully compensate for it.

SUMMARY OF THE INVENTION

The present invention avoids the problems involved with the prior art approaches to power factor correction by providing a compensator system for instantaneously optimizing reactive kva in an a.c. power system containing both linear and non-linear reactive loads. In this compensator system, which produces the proper level of equivalent reactance to match and cancel the reactance of the a.c. power system, the inductive reactance of the compensator system is continuously adjusted to control the level of equivalent reactance produced. This continuous adjustment of the inductive reactance is accomplished with a saturable core reactor which allows production of the proper level of equivalent reactance for complete power factor correction within a single cycle of the alternating current.

The present compensator system employs a transformer, the primary of which is connected across the a.c. power line. A correction circuit includes the transformer secondary, a fixed capacitance and a saturable core reactor connected in series. The saturable core reactor is energized by a d.c. power source in response to measurements of the line voltage and line current to reflect the proper level of equivalent reactive kva to the power source.

DRAWING

The best mode presently contemplated of carrying out the invention will be understood from the detailed description of the preferred embodiments illustrated in the accompanying drawings in which.

DETAILED DESCRIPTION

Figure 1:
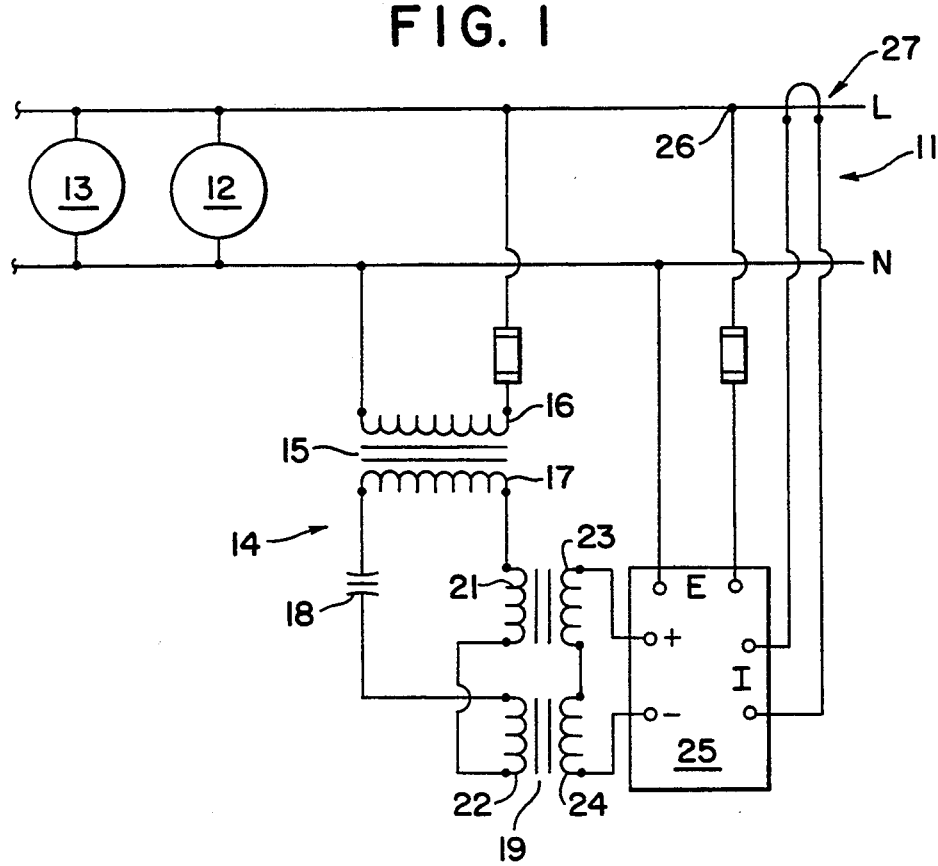
FIG. 1 is a circuit diagram showing the compensator system of the present invention in its broadest form connected to an a.c. power system.

Referring more particularly to FIG. 1 of the drawing, a single phase a.c. power system is shown in which a power line 11 has a line terminal L and a neutral N feeding linear and/or non-linear reactive loads 12 & 13. A power factor compensator system according to the present invention is shown at 14 as including a conventional transformer 15, the primary winding 16 of which is connected across the power line. A fixed capacitor 18 is connected in series with the a.c. windings 21, 22 of a saturable core reactor 19 and the secondary winding 17 of the transformer 15 to form an LRC circuit. A d.c. current power supply and the logic controller 25 is connected to the d.c. control windings 23,24 of the saturable core reactor 19. Sensors, shown schematically at 26 as a direct couple to the power line 11 and at 27 as a current transformer, are connected to the power line 11 to detect instantaneous levels of line voltage and line current which are transmitted continuously to the logic controller 25. The saturable core reactor is a form of an iron core choke in which the degree of core saturation is controlled by d.c. windings so as to vary the inductance of the reactor. The reactor 19 includes a.c windings 21, 22 and d.c. windings 23, 24 which are polarized relative to each other in order to equalize the variable inductance over both halves of the applied sine wave.

In the operation of the present compensator system, the instantaneous power factor, or Cos. $\phi$, of the power system is continuously calculated by the logic controller 25 from measurements of the line voltage and line current. The equivalent reactance necessary to compensate for the power factor is similarly continuously determined and a d.c. bias voltage which is inversely proportional to Cos. $\phi$ is continuously applied to the d.c. control windings 23, 24 of the saturable core reactor 19. The d.c. control signal sets up a biasing flux in the cores of the saturable core reactor which adjusts the inductance level of the LRC circuit. The varying inductance of the saturable core reactor is continuously vectorally added to the output of the capacitor 18 to produce an effective level of equivalent reactance which is then reflected to the power system where it opposes or cancels the reactive kva, thereby tuning the power system to a pre-determined frequency, i.e., 60 cycles, and optimizing the power factor compensation.

To further explain the manner in which the present invention operates, the sum of the voltages in the LRC circuit can be expressed in rectangular form as $E_{sum} = V_R + jV_L - jV_C$. Therefore, since the voltage across the saturable reactor 19 leads the common current by 90°, and the voltage across the fixed capacitor 18 lags the current by 90°, the phasors can be added by simple arithmetic subtraction as $E_{sum} = V_R + j(V_L - V_C)$. Since the over all circuit reactance cannot be both inductive and capacitive at the same instant in time, the common series current must either lead or lag the applied emf. Therfore, by altering the reactance of saturable core reactor 19 by the amount of applied d.c. control voltage in windings 23, 24, the circuit can be made to appear as either capacitive or inductive. Thus, the net equivalent reactance inductively reflected to the power system or power line is $Z = R + j(X_L - X_C)$ or $Z = \sqrt{R^2 + X^2_{eq}}/\arctan X_{eq}/R$ or $X_{eq} = X_L - X_C$. Hence, the total impedance of the circuit becomes $Z = \sqrt{R^2 + X_{eq}^2}$ or $Z = \sqrt{R^2 + (L-C)^2}$. The present compensator system controls the impedance of the power system by continuously adjusting the level of C or L so as to continuously cancel L or C, respectively. This is accomplished by means of the saturable core reactor which continuously adjusts the effective level of the capacitance C reflected from capacitor 18 by constant adjustment of the inductance of the LRC circuit.

Figure 2:
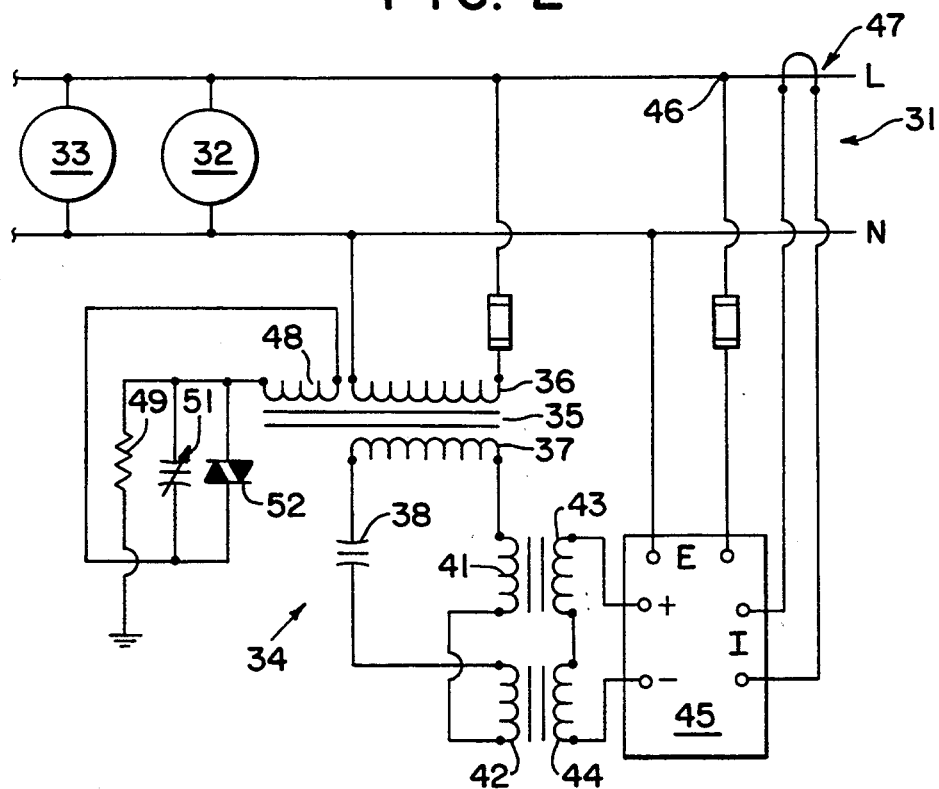
FIG. 2 is a circuit diagram showing a preferred embodiment of the present invention for a single phase power system.

FIG. 2 of the drawing shows the preferred form of the present compensator system as applied to a single phase a.c. power system which includes a power line 31 having a line terminal L and a neutral N supplying a.c. power to linear and or non-linear reactive loads 32, 333. The compensator system 34 includes a reflux tranformer 35, such as disclosed and claimed in U.S. patent application Ser. No. 871066, filed Apr. 16, 1992, the disclosure of which is incorporated herein by reference. Reflux transformer 35 includes a primary winding 36 which is connected across power line 31. A fixed capacitor 38 is connected in series with the a.c. windings 41, 42 of a saturable core reactor 39 and the secondary winding 37 of the reflux transformer 35 to form an LRC circuit. A d.c. power supply and logic controller 45 is connected to the d.c. control windings 43, 44 of the saturable core reactor 39. Sensors 46, 47 are connected to the power line 31 to detect instantaneous levels of line voltage and line current which are transmitted continuously to the logic controller 45. The reflux transformer 35 includes a third, or reflux, winding 48 which is combined with the primary winding 36 in critically coupled transformer relation. The reflux winding 48 is connected to neutral or electrical ground through a linear resistor 49 and an RC circuit which includes a tunable capacitive element 51 connected in parallel with a non-linear resistor 52, such as a metal oxide semi-conductor or varistor. The tunable capacitive element can be a variable transformer, a saturable reactor, or manual or electronic means of varying the applied voltage to the capacitive element.

The compensator system of FIG. 2 functions in the same manner as the system of FIG. 1, i.e., the inductance of the LRC circuit is continuously adjusted by the biasing flux set up in the cores of the saturable reactor 39. The varying inductance of the saturable core reactor is continuously vectorally added to the output of the capacitor 38 to produce an effective level of capacitance, or inductance, which is then reflected to tune the power system and optimize the power factor compensation.

The reflux transformer offers the advantage that through adjustment of the capacitive element 51, the impedances of the primary winding 36 and the secondary winding 37 can be matched, thus allowing energy to flow freely between them with a reduction in transformation leakage reactance, copper losses, etc. which allows the use of a smaller transformer. The reflux transformer has the further advantage that it does not cause resonance problems and actually helps decrease harmonic voltages. In addition, the surge impedance of the device is both limited and controlled.

Figure 3:
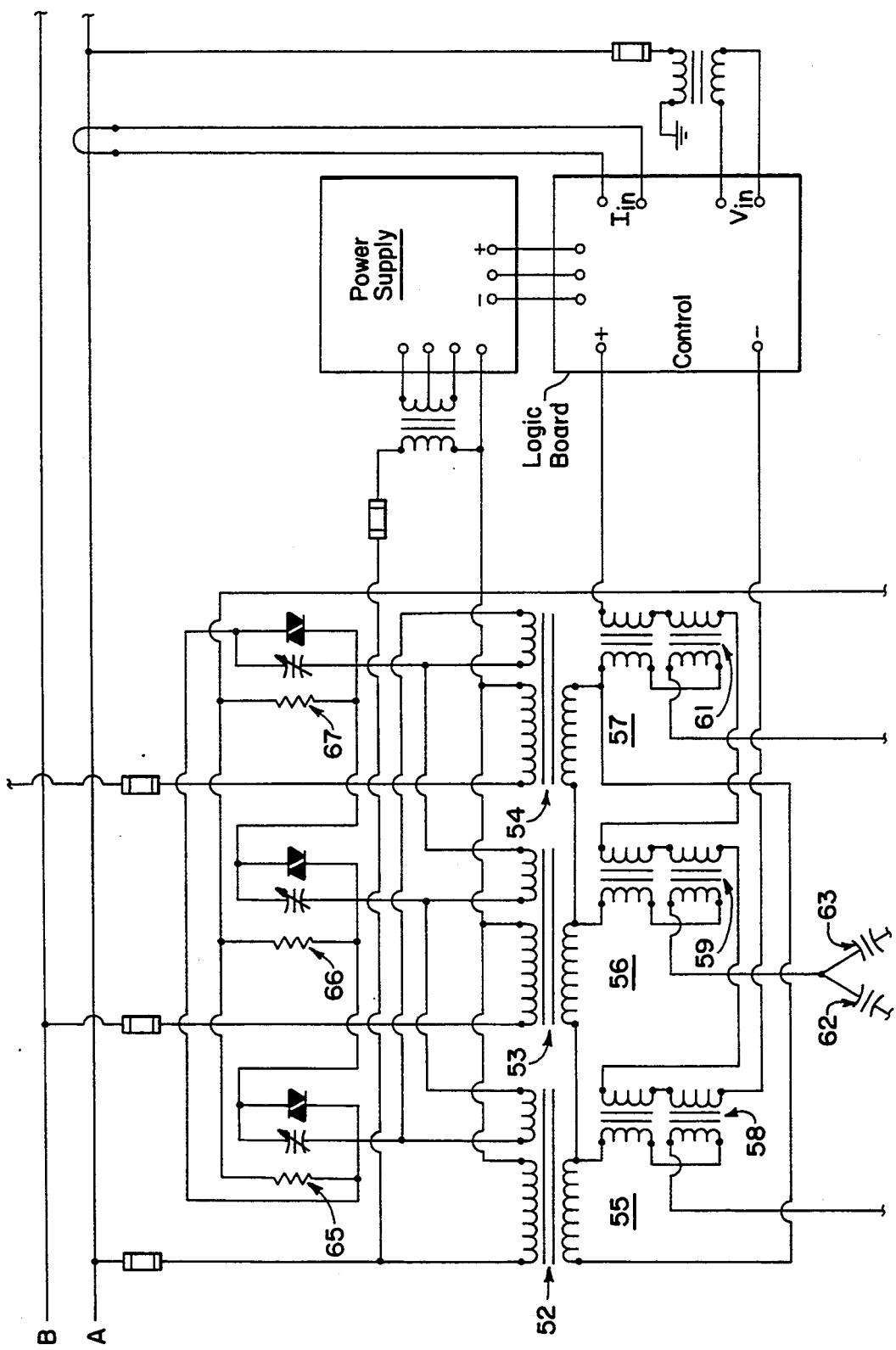
FIG. 3 is a circuit diagram showing the present compensator system as applied to a three phase power system.

FIG. 3 of the drawing illustrates a compensator system which is suitable for use with a three phase a.c. power system. In this embodiment a system such as shown in FIG. 2 is connected to each of the three lines A, B, C. Three reflux transformers 52, 53, 54 each have their primary winding connected between a power line and electrical ground or neutral. The secondary winding of each reflux transformer is connected in a series LRC circuit 55, 56, 57. LRC circuit 55 includes the secondary winding of transformer 52, the a.c. windings of a saturable core reactor 58, and a fixed capacitor 62; LRC circuit 56 includes the secondary winding of transformer 53, the a.c. windings of saturable reactor 59, and fixed capacitor 63; and LRC circuit 57 includes the secondary winding of transformer 54, the a.c. windings of saturable reactor 61, and the fixed capacitor 64. The tertiary winding of each reflux transformer is connected to electrical ground or neutral through a linear resistor and a series connected RC circuit 65, 66, 67. The d.c. control windings of the saturable core reactors 58, 59, 61 are connected to a d.c. power supply which is controlled by a logic controller in response to measurements of power factor derived from line voltage and line current. The components, i.e., reflux transformers, saturable core reactors, RC circuits, etc. are similar to those described in connection with the single phase system of FIG. 2.

The operation of the three phase compensator system of FIG. 3 is similar to that of the single phase system of FIG. 2, in that, the reactance of each LRC circuit is adjusted in response to the biasing flux in the cores of the saturable reactors and then reflected to the power system to correct the power factor.

It should be understood that, in accordance with current usage, a savings in manufacturing cost may be realized with little decrease in performance of the system of FIG. 3 by omitting the saturable reactor 59 and/or the transformer 53 and connecting the remaining transformers with an open delta connection.

Figure 4:
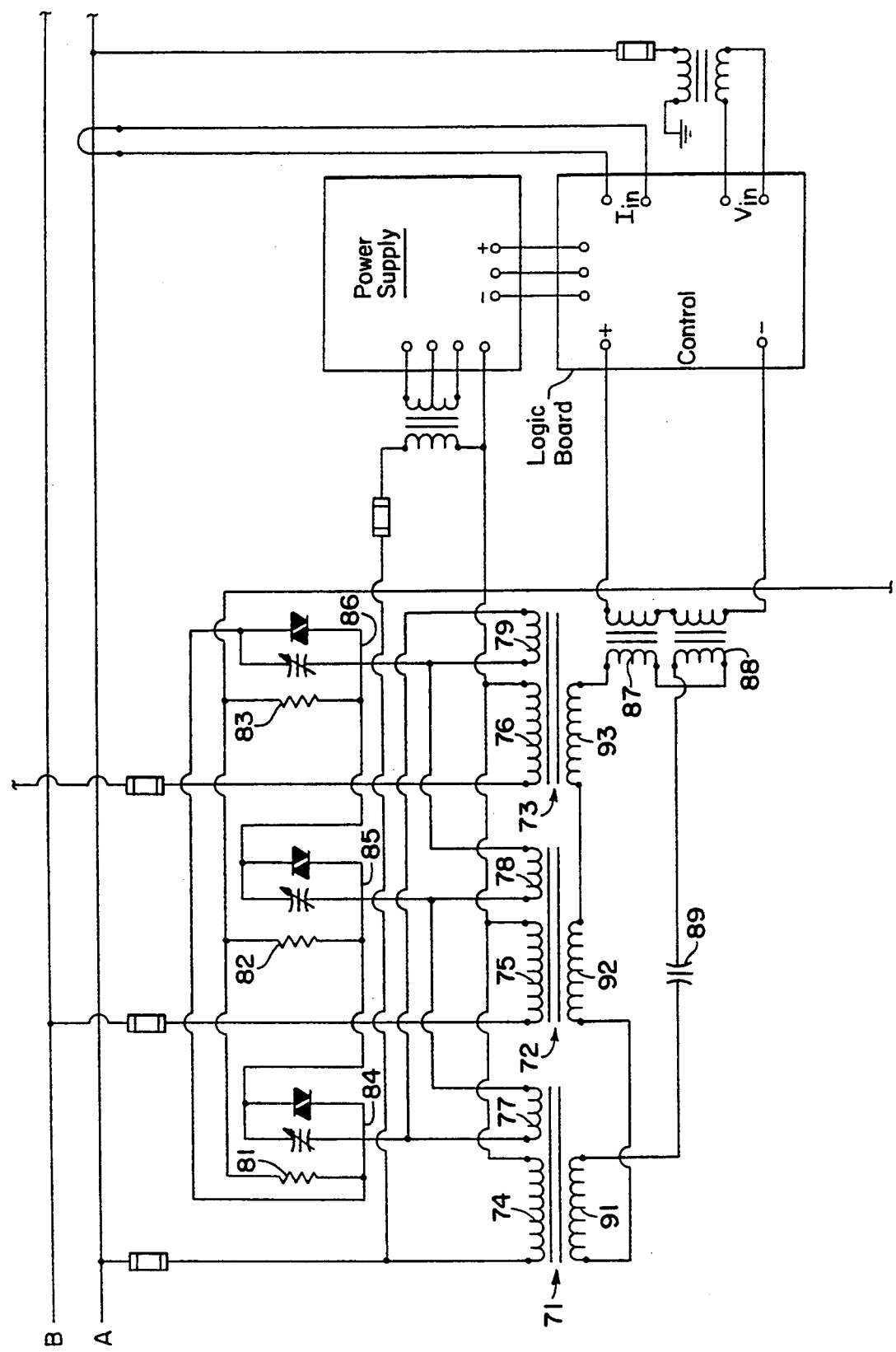
FIG. 4 is a circuit diagram of a preferred embodiment of the present invention for a three phase power system.

A preferred embodiment of the present compensator as applied to a three phase power system is illustrated in FIG. 4. This configuration includes three reflux transformers 71, 72, 73 connected in a wye. Each transformer has its primary winding 74, 76, 76 connected to one of the power lines A, B, C through a suitable fuze. The tertiary winding 77, 78, 79 of each reflux transformer is connected to electrical ground or neutral through a linear resistor 81, 82, 83 and an RC circuit 84, 85, 86. The a.c. windings 87, 88 of a saturable core reactor are connected in series with a fixed capacitor 89 and the secondary windings 91, 92, 93 of the reflux transformers to form an LRC circuit. The secondary windings 91, 92, 93 are interconnected in an incorrect delta connection, i.e., the connection of winding 91 is reversed from that of windings 92, 93. By means of this incorrect delta connection of the secondary windings, a single capacitor and a single saturable core reactor can be utilized in the LRC circuit.

The operation of the compensator system of FIG. 4 is similar to that of the three phase system of FIG. 3, but at substantially reduced manufacturing cost. As in the system of FIG. 3, the reactance of the LRC circuit is continuously adjusted in response to the biasing flux in the core(s) of the saturable reactor and then reflected to the power system to correct the power factor.

It should be understood that the system of FIG. 4 can be modified to include two transformers connected in an open delta. This configuration would result in third phase harmonics, but may be usable for some applications.

While the present compensator has been described in connection with its use for power factor correction, it should be understood that it has application to other uses, such as, controlling current flow in an a.c. circuit. By varying the inductance in a series LRC circuit the impedance in the a.c. circuit, and consequently the current flow, can be controlled over a wide range from zero to a desired maximum.

In the systems of FIGS. 3 & 4, it is desireable that the interconnections of the primary windings and those of the secondary windings be wye-delta, or delta-wye, in order to cancel the third harmonic of the current which is produced by the non-linear iron core. The d.c. current supplied to the controller may be provided from any suitable source, such as, a battery or through a rectifier from the power line. The ratings of the capacitor(s) is selected to provide a potential capacitance in excess of the maximum level anticipated to be required for power factor compensation of the particular power system with which it is employed. While two d.c. control windings are illustrated in the saturable core reactors, it is understood that a single winding will be required if a common core is employed instead of the two illustrated. Also, with two cores, either pair of windings may be polarized.

A major advantage of the present invention when it is used for power factor compensation in an a.c. power system is that it will tune the entire power system to a predetermined frequency, thereby avoiding the use of a shunt reactor at the sending end of the power system.

While the invention has been described with reference to specifically illustrated preferred embodiments, it should be realized that various changes may be made without departing from the disclosed inventive subject matter particularly pointed out and claimed herebelow.

I claim:

1. For use with an a.c. power system which includes a power line and linear and non-linear reactive loads, a compensator for optimizing kva with capacitive or inductive equivalent reactance without risk of series resonance from high order harmonics which comprises: A transformer having a primary and a secondary winding, the primary winding being adapted to be connected across the power line, means for inductively reflecting an equivalent reactance to the power line, said means including the secondary winding inductively coupled to the primary winding, a fixed capacitance and a variable inductive reactance connected in series with the secondary winding and isolated electrically from the power line, and means for continuously adjusting the inductive reactance to maintain the equivalent reactance in balance with the reactance of the power system.

2. A compensator as set forth in claim 1 in which the variable inductive reactance is a saturable reactor.

3. A compensator as set forth in claim 2 in which the saturable reactor includes a pair of polarized a.c. windings and at least one d.c. control winding, said a.c. windings being connected in series with the secondary winding and the fixed capacitance to form and LRC circuit.

4. A compensator as set forth in claim 3 in which said means includes a d.c. power supply and logic controller adapted to be connected between the d.c. control winding and the power line for applying a d.c. bias voltage to the control winding to adjust the inductance of the LRC circuit and produce the proper equivalent reactance.

5. A compensator as set forth in claim 1 in which the transformer has a tertiary winding in critically coupled relation with the primary winding and is tuned for maximum energy transfer between the primary and secondary windings.

6. For use with an a.c. power system which includes a power line and a reactive load, a compensator for controlling current flow to the load, comprising: a series LRC circuit inductively connected to the power line, said circuit including a fixed resistance and a fixed capacitance and a saturable reactor, said reactor including a pair of a.c. windings and at least one d.c. winding which are polarized relative to each other, the a.c. winding being connected to the fixed resistance and fixed capacitance, and means connected to the saturable reactor for adjusting the inductance of said circuit in response to measurements of the reactance of the system to control the impedance of the system and thereby control current flow to the load, said means including a d.c. power supply connected to the d.c. winding and means for adjusting the level of d.c. voltage applied to the d.c. winding.

7. For use with a three-phase a.c. power system which includes three power lines and at least one reactive load, a compensator system for optimizing kva with equivalent reactance which comprises: a plurality of reflux transformers, each of which includes a primary winding adapted to be connected to a power line, a secondary winding inductively coupled to the primary winding, and a tertiary winding in critically coupled relation with the primary winding, a fixed capacitance and a variable inductive reactance connected in series with the secondary windings and isolated electrically from the power line, and means for continuously adjusting the inductive reactance to maintain the equivalent reactance in balance with the reactance of the power system.

8. A compensator system as set forth in claim 7 which includes three reflux transformers, the secondary windings of which are connected in an incorrect delta.

9. A compensator system as set forth in claim 8 in which the primary windings are connected in a wye, the tertiary windings are connected in a wye, and the variable inductive reactance is a saturable reactor which has a pair of a.c. windings and at least one d.c. control winding.

10. A compensator system as set forth in claim 9 in which said means includes a d.c. power supply and logic controller connected to said control windings and adapted to be connected to one of said power lines.

* * * * *